(12) United States Patent
Qi et al.

(10) Patent No.: US 11,842,425 B2
(45) Date of Patent: Dec. 12, 2023

(54) INTERACTION METHOD AND APPARATUS, AND ELECTRONIC DEVICE AND COMPUTER-READABLE STORAGE MEDIUM

(71) Applicant: Beijing Bytedance Network Technology Co., Ltd., Beijing (CN)

(72) Inventors: Xiaojia Qi, Beijing (CN); Jie Zheng, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/821,097

(22) Filed: Aug. 19, 2022

(65) Prior Publication Data

US 2022/0398786 A1    Dec. 15, 2022

Related U.S. Application Data

(63) Continuation of application No. PCT/CN2021/104985, filed on Jul. 7, 2021.

(30) Foreign Application Priority Data

Jul. 23, 2020  (CN) .......................... 202010719988.2

(51) Int. Cl.
G06T 11/00      (2006.01)
G06T 5/20       (2006.01)

(52) U.S. Cl.
CPC .............. G06T 11/00 (2013.01); G06T 5/20 (2013.01); G06T 2200/24 (2013.01)

(58) Field of Classification Search
None
See application file for complete search history.

(56) References Cited

U.S. PATENT DOCUMENTS

| 2010/0201709 | A1* | 8/2010 | Yang | H04N 21/4318 715/810 |
| 2015/0100813 | A1* | 4/2015 | Han | G06F 1/3265 713/340 |

(Continued)

FOREIGN PATENT DOCUMENTS

| CN | 104778735 A | 7/2015 |
| CN | 105377448 A | 3/2016 |

(Continued)

OTHER PUBLICATIONS

International Search Report for International Patent Application No. PCT/CN2021/104985, dated Oct. 11, 2021 (7 pages).

(Continued)

Primary Examiner — Kyle Zhai
(74) Attorney, Agent, or Firm — ARENTFOX SCHIFF LLP

(57) ABSTRACT

The present disclosure provides an interaction method, an interaction apparatus, an electronic device, and a computer-readable storage medium, which relate to the technical field of image processing. The method includes: displaying a background image; displaying an initial picture of a target visual effect at a preset position of the background image; controlling the target visual effect to gradually change from the initial picture to a target picture in response to a visual effect change instruction triggered by a user; and adjusting a filter effect of the background image to allow the filter effect of the background image to gradually change from a first filter effect to a second filter effect during a change of the target visual effect.

20 Claims, 8 Drawing Sheets

(56) References Cited

U.S. PATENT DOCUMENTS

| | | | | |
|---|---|---|---|---|
| 2016/0239701 | A1* | 8/2016 | Lee | G06V 40/1347 |
| 2016/0352887 | A1* | 12/2016 | Na | H04M 1/72436 |
| 2019/0132642 | A1 | 5/2019 | Wang et al. | |
| 2020/0211201 | A1* | 7/2020 | Chiang | G06T 7/11 |

FOREIGN PATENT DOCUMENTS

| | | |
|---|---|---|
| CN | 108287744 A | 7/2018 |
| CN | 108989706 A | 12/2018 |
| CN | 109213705 A | 1/2019 |
| CN | 109788312 A | 5/2019 |
| CN | 110022499 A | 7/2019 |
| CN | 110072151 A | 7/2019 |
| CN | 110324646 A | 10/2019 |
| CN | 110730374 A | 1/2020 |
| CN | 110858277 A | 3/2020 |
| CN | 111107280 A | 5/2020 |
| CN | 111240482 A | 6/2020 |
| CN | 111242881 A | 6/2020 |
| CN | 111899192 A | 11/2020 |
| JP | 2000115635 A | 4/2000 |
| JP | 2012503813 A | 2/2012 |
| JP | 2020504342 A | 2/2020 |
| KR | 1020140128210 A | 11/2014 |
| KR | 101522468 B1 | 5/2015 |
| KR | 1020180126440 A | 11/2018 |
| KR | 1020200023449 A | 3/2020 |
| WO | 2020024692 A1 | 2/2020 |

OTHER PUBLICATIONS

Extended European Search Report dated Aug. 4, 2023, in EP21847338.7, 8 pages.

* cited by examiner

INTERACTION METHOD AND APPARATUS, AND ELECTRONIC DEVICE AND COMPUTER-READABLE STORAGE MEDIUM

This application is a continuation of International Patent Application No. PCT/CN2021/104985 filed on Jul. 7, 2021, which claims the priority to and benefits of Chinese Patent Application No. 202010719988.2, filed on Jul. 23, 2020. All the aforementioned patent applications are hereby incorporated by reference in their entireties.

TECHNICAL FIELD

The present disclosure relates to the technical field of image processing, and in particular, the present disclosure relates to an interaction method, an interaction apparatus, an electronic device, and a computer-readable storage medium.

BACKGROUND

Human-computer interaction refers to a process of information exchange between humans and computers using a certain dialogue language to complete required tasks in a certain interactive way. Human-computer interaction technology enables dialogue between humans and computers to be implemented in an efficient manner through, for example, input and output devices of computers. Human-computer interaction technology includes that the machine provides a large amount of relevant information, prompts, instructions, or the like to users through output or display devices, and users input relevant information, answer questions, respond to prompts and instructions, or the like to the machine through input devices. With the continuous development and progress of human-computer interaction technology, human-computer interaction technology will be applied to various electronic products.

SUMMARY

The embodiments of the present disclosure provide an interaction method, an interaction apparatus, an electronic device, and a computer-readable storage medium.

An embodiment of the present disclosure provides an interaction method, and the method includes:
  displaying a background image;
  displaying an initial picture of a target visual effect at a preset position of the background image;
  controlling the target visual effect to gradually change from the initial picture to a target picture in response to a visual effect change instruction triggered by a user; and
  adjusting a filter effect of the background image to allow the filter effect of the background image to gradually change from a first filter effect to a second filter effect during a change of the target visual effect.

Another embodiment of the present disclosure provides an interaction apparatus, and the apparatus includes:
  a first display module, being configured to display a background image;
  a second display module, being configured to display an initial picture of a target visual effect at a preset position of the background image;
  a response module, being configured to control the target visual effect to gradually change from the initial picture to a target picture in response to a visual effect change instruction triggered by a user; and
  an adjustment module, being configured to adjust a filter effect of the background image to allow the filter effect of the background image to gradually change from a first filter effect to a second filter effect during a change of the target visual effect.

Still another embodiment of the present disclosure provides an electronic device, and the electronic device includes one or more processors and a memory; and the memory is configured to store one or more applications, and the one or more applications upon execution by the one or more processors, cause the one or more processors to perform operations corresponding to the interaction method provided in the first aspect of the present disclosure.

Further still another embodiment of the present disclosure provides a computer-readable storage medium, on which a computer program is stored, and the computer program, when executed by a processor, causes the processor to implement the interaction method provided in the first aspect of the present disclosure.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the components and elements are not necessarily drawn to scale.

DETAILED DESCRIPTION

Figure 1:
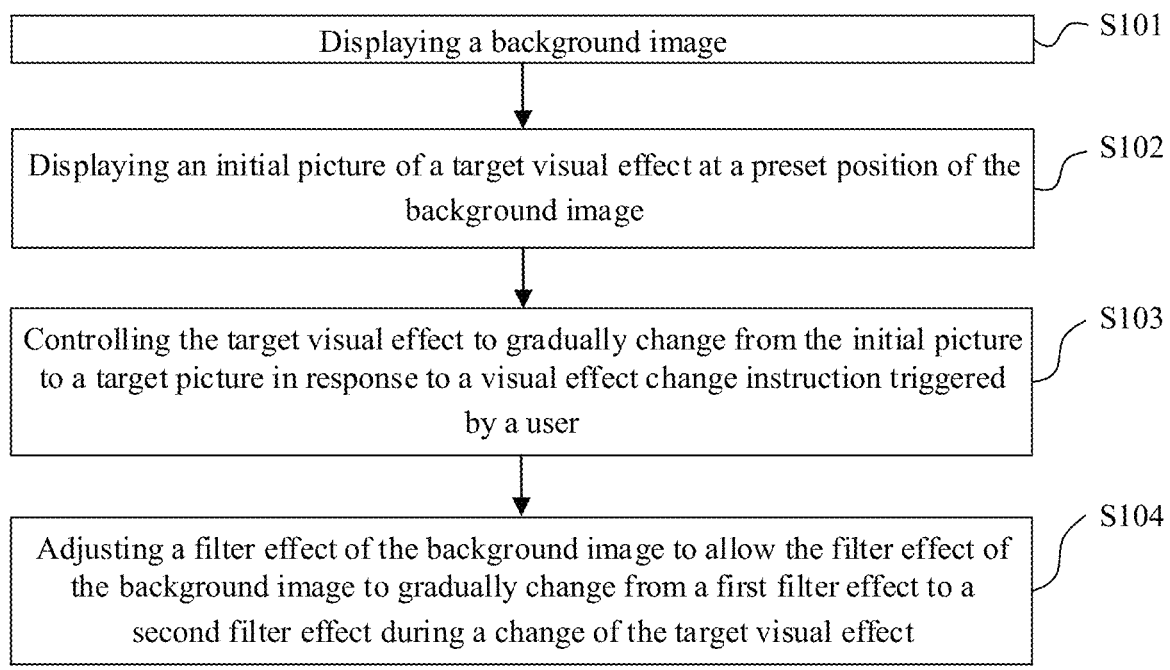
FIG. 1 is a schematic flowchart of an interaction method provided by at least one embodiment of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes and are not intended to limit the protection scope of the present disclosure.

It should be understood that the various steps described in the method embodiments of the present disclosure may be performed in different orders and/or in parallel. Furthermore, the method embodiments may include additional steps and/or omit performing the illustrated steps. The protection scope of the present disclosure is not limited in this aspect.

As used herein, the term "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be noted that concepts such as the "first," "second," or the like mentioned in the present disclosure are only used to distinguish different devices, modules or units, and are not used to limit these devices, modules or units to be different devices, modules or units, nor to limit the interdependence relationship or the order of functions performed by these devices, modules or units.

It should be noted that the modifications of "a," "an," "a plurality of," or the like mentioned in the present disclosure are illustrative rather than restrictive, and those skilled in the art should understand that unless the context clearly indicates otherwise, these modifications should be understood as "one or more."

The names of messages or information exchanged between multiple devices in the embodiments of the present disclosure are only for illustrative purposes, and are not intended to limit the scope of these messages or information.

In order to make objects, technical solutions, and advantages of the present disclosure apparent, the embodiments of the present disclosure will be further described in detail below with reference to the accompanying drawings.

The inventors noticed that users may only usually add visual effects or special effects to videos according to the visual effects among the preset visual effect templates, or may only watch videos with preset visual effects or special effects, lacking user participation and interaction.

The interaction method, the interaction apparatus, the electronic device, and the computer-readable storage medium provided by the present disclosure are intended to solve the above-mentioned problems, and for example, the problem of low interactivity of users when making videos or watching videos can be solved.

The technical solutions of the present disclosure and how the technical solutions of the present disclosure solve the above-mentioned problems will be described in detail below with specific embodiments. The following specific embodiments may be combined with each other, and the same or similar concepts or processes may not be repeated in some embodiments. The embodiments of the present disclosure will be described below with reference to the drawings.

At least one embodiment of the present disclosure provides an interaction method. As illustrated in FIG. 1, the method includes the following steps S101 to S104.

Step S101: displaying a background image.

The interaction method provided by the embodiments of the present disclosure may be performed by a terminal device, and the terminal device may be a mobile terminal, a computer device, etc. For example, the mobile terminal may be a smart phone, a personal digital assistant, a tablet computer, a wearable device with a display screen, etc., and the computer device may be a desktop computer, a laptop computer, an all-in-one computer, etc.

The present disclosure does not limit the type of the background image. For example, the background image may include a video image, a picture, or the like. The present disclosure also does not limit the content of the background image. For example, the background image may include a human image, an animal image, a landscape image, or any combination of images of animals, people, and landscapes.

In an embodiment of the present disclosure, the background image includes at least one of the following: a real-time recorded video image, a pre-selected recorded video image, and at least one pre-selected image.

It should be understood that the background image may be a video image recorded in real time at the terminal during video production, a recorded video image selected during video production, or a selected picture. In addition, different videos and/or different pictures may be selected and displayed as the background image according to a preset presentation manner.

Optionally, the background image may also include a video image presented on the terminal, such as an advertisement video image.

Step S102: displaying an initial picture of a target visual effect at a preset position of the background image.

For example, the target visual effect in the embodiments of the present disclosure may be an animation visual special effect. The preset position of the background image may be a preset position in the orientation, such as the center, upper left corner or lower right corner of the background image. The preset position of the background image may also be a preset position in time, for example, in the case that the background image is a video image, when the video image is played to a preset time, the initial picture of the target visual effect is displayed.

It should be noted that, in the present disclosure, the "visual effect" includes such as a visual special effect, a sound special effect, etc. The above-mentioned visual effects may be special effects produced by such as the software that do not generally appear in reality, or the above-mentioned visual effects may be effects in reality simulated by, for example, the software or the like. For example, the above-mentioned software can be executed by an electronic device or the like.

In an embodiment of the present disclosure, Step S102 includes:

Step S1021: displaying the initial picture of the target visual effect at the preset position of the background image in response to a visual effect display instruction.

For example, the visual effect display instruction is an instruction triggered by the user. For example, the user selects the target visual effect among the visual effect templates, which triggers the visual effect display instruction of the target visual effect. For another example, the user clicks a specified button on the screen or gives a specified gesture, which triggers the visual effect display instruction of the target visual effect. The visual effect display instruction may also be preset. For example, in the case that the background image presented by the terminal device is a video image, when the video playback time reaches the predetermined time (such as 10 seconds), or when a certain target object (such as a flower or a dog) in the video is captured, the visual effect display instruction is considered to be triggered. In response to the visual effect display instruction, the terminal device displays the initial picture of the target visual effect at the preset position of the background image.

In an embodiment, the target visual effect is associated with the background image, i.e., the visual effect content of the target visual effect is associated with the image content of the background image. For example, in the case that the background image is a video image about the mobile phone advertisement, the target visual effect may be the animation of the battery power change of the mobile phone, and the initial picture of the target visual effect may be a battery in a low power state. Specifically, in the case that the background image is an advertisement video about a mobile phone, when the video playback time reaches the predetermined time (for example, 10 seconds), the visual effect display instruction is triggered, and the terminal device may display the battery in a low power state at the center of the background image in response to the visual effect display instruction.

It should be noted that the target visual effect may be pre-stored in a server or in a terminal. When the visual effect display instruction is triggered, the terminal device may display the initial picture of the target visual effect at the preset position of the background image in response to the visual effect display instruction, and the initial picture is the first frame image of the target visual effect.

In an embodiment of the present disclosure, the terminal device displaying the initial picture of the target visual effect further includes: adjusting the filter effect of the background image to allow the filter effect of the background image to change from the third filter effect to the first filter effect.

For example, the filter effect of the background image includes blurriness, grayscale, brightness, or the like of the background image. Taking the filter effect including the brightness effect as an example, the brightness effect of the third filter effect may be medium brightness, the brightness effect of the first filter effect may be low brightness, and the brightness levels of medium brightness and low brightness may be represented by preset brightness values. The present disclosure does not limit the specific brightness of the background image, which is only used for illustration purposes here.

Specifically, HSB (Hue, Saturation, and Brightness) values corresponding to the first filter effect may be stored in advance. After the visual effect display instruction is triggered, the terminal device may replace the HSB values corresponding to the third filter effect in the background image with the pre-stored HSB values corresponding to the first filter effect. It should be noted that the third filter effect is the initial filter effect when the background image is displayed in Step S101, and the HSB values can be adjusted to allow the third filter effect to change to the first filter effect, for example, by adjusting the B value in the HSB values to allow the brightness of the background image to be dimmed.

It should be understood by those skilled in the art that the above only takes the filter effect including the brightness effect as an example for description. The present disclosure does not limit the type of the filter effect, and for other types of filter effects, the terminal device may adjust the filter effect of the background image by adjusting parameters such as the saturation, hue, or the like of the image in a similar manner, so that the filter effect of the background image is changed from the third filter effect to the first filter effect.

Step S103: controlling the target visual effect to gradually change from the initial picture to a target picture in response to a visual effect change instruction triggered by a user.

For example, the visual effect change instruction may be triggered by the user, such as a specific audio or a specific action. When the terminal device captures the specific audio or action of the user, it can be considered that the user triggers the visual effect change instruction. The present disclosure does not limit the triggering manner of the visual effect change instruction.

The terminal device can respond to the visual effect change instruction, thereby controlling the initial picture of the target visual effect to gradually change to the target picture. In an embodiment, the terminal device can gradually change the RGB (Red, Green, and Blue) values of each key frame image in the target visual effect image to achieve the effect of gradually changing from the initial picture to the target picture.

In an embodiment of the present disclosure, the above-mentioned interaction method further includes: displaying a first prompt, the first prompt being configured to instruct the user to perform a preset action; and generating the visual effect change instruction in response to detecting the preset action performed by the user.

It may be understood that, the visual effect change instruction may be generated in response to the user inputting a preset action. Specifically, the terminal device may display a first prompt message, for example, the first prompt message includes prompting the user to perform a specific action, make a specific expression, make a specific sound, etc., for example, prompting the user to input an action of "hand heart" or "nod." When the terminal device detects that the user has inputted the action of "hand heart" or "nod," it is considered that the user triggers the visual effect change instruction, and the visual effect change instruction is generated.

In an embodiment of the present disclosure, generating the visual effect change instruction further includes: generating the visual effect change instruction in response to detecting that the user has answered the interaction question correctly. Specifically, the terminal device may give a question related to the background video image being currently displayed or related to the target visual effect in the form of text display or voice playback. When it is detected that the user has answered the correct answer, it is considered that the user triggers the visual effect change instruction, and accordingly the visual effect change instruction is generated. For example, in the case that the background image currently displayed is a video about a certain product (for example, a mobile phone), the terminal device gives a question about the brand of the mobile phone, and when the user inputs, by text or voice, the correct brand of the mobile phone, it is considered that the user triggers the visual effect change instruction.

Step S104: adjusting a filter effect of the background image to allow the filter effect of the background image to gradually change from a first filter effect to a second filter effect during a change of the target visual effect.

For example, still taking the filter effect including the brightness effect as an example, the brightness effect of the first filter effect may be low brightness, and the brightness effect of the second filter effect may be high brightness. It may be understood that during the changing process of the target visual effect, the filter effect of the background image may be adjusted at the same time to present a rich visual special effect, so as to attract the user to make videos or attract the user to visit and interact with videos.

Specifically, the HSB values corresponding to the second filter effect may be pre-stored, and after the visual effect change instruction being detected, the terminal device may gradually adjust the HSB values corresponding to the first filter effect of the background image until reaching the HSB values corresponding to the second filter effect. It should be noted that, the first filter effect may be a filter effect in which the brightness of the background image is dimmed by adjusting the B value in the HSB values corresponding to the third filter effect. For example, the HSB values corresponding to the first filter effect may be gradually adjusted to allow the first filter effect to gradually change to the second filter effect. For example, the B value in the HSB values corresponding to the first filter effect may be gradually adjusted to brighten the brightness of the background image.

It should be noted that the above only takes the brightness effect as an example to introduce the filter effect, and the brightness effect is only one of effect elements in the filter effect. The present disclosure can actually transform one or more effect elements in the brightness, hue, saturation, or the like, that is, the present disclosure does not limit the combination manner of effect elements that need to be transformed, nor the transformation manner of the filter effect.

In an embodiment of the present disclosure, adjusting the filter effect of the background image in Step S104 includes: adjusting a change progress of the filter effect of the background image based on a change progress of the target visual effect.

It may be understood that, in order to make the visual effect viewed by the user more uniform, the change progress of the target visual effect may be unified with the change progress of the filter effect of the background image. That is, the terminal device can adjust the change progress of the filter effect of the background image according to the change progress of the target visual effect, so that the filter effect of the background image changes with the change of the target visual effect.

For example, taking the case where the change of the target visual effect includes the change of the color of the special effect picture and the change of the filter effect includes the change of the brightness effect as an example, the terminal device takes a target visual effect layer in the video picture as the first image layer and a background image layer as the second image layer, and by setting the change of the color of the special effect picture of the first image layer to be unified with the change of the brightness of the background image of the second image layer, the effect that the change progress of the target visual effect is unified with the change progress of the filter effect of the background image can be achieved.

Specifically, the terminal device may preset the corresponding relationship between the RGB values of the first image layer (i.e., the target visual effect layer) in the video picture and the HSB values of the second image layer (i.e., the background image layer), that is, the RGB values of each key frame image of the target visual effect layer at each time of change is in a one-to-one correspondence with the HSB values, at each corresponding time of change, of the background image in the background image layer at each corresponding time node. Based on this, by gradually changing the RGB values of each key frame image, the terminal device can simultaneously change the HSB values of the background image corresponding to each time of change, so as to achieve the result that the change progress of the target visual effect is unified with the change progress of the filter effect of the background image in the changing process of the target visual effect.

In the present disclosure, by displaying the background image, displaying the initial picture of the target visual effect at the preset position of the background image, and responding to the visual effect change instruction triggered by the user, the target visual effect can be controlled to gradually change from the initial picture to the target picture. That is, by interacting with the user, the user can participate in the changing process of the visual effect, and the participation of the user can be improved. Moreover, as the target visual effect gradually changes from the initial picture to the target picture, the filter effect of the background image is gradually adjusted, so as to present an abundant visual effect through the combination of visual special effect change and filter effect change, and improve the enthusiasm of participation and interaction of the user.

In an embodiment of the present disclosure, after Step S103 "controlling the target visual effect to gradually change from the initial picture to a target picture in response to a visual effect change instruction triggered by a user", the interaction method further includes:

Step S105: presenting information related to the target visual effect.

The information includes, but is not limited to, text, icons, static images, animation effects, or the like. The present disclosure does not limit the specific display manner and display content of the information.

For example, the information related to the target visual effect includes promotional information related to the target visual effect. For example, in the case where the animation of the target visual effect is the animation of the charging effect of the mobile phone battery, the target visual effect gradually changes from the initial picture to the target picture, which is exemplified as the mobile phone battery gradually changes from being with no power to full power, and accordingly the information related to the target visual effect may be the promotional information about the mobile phone, such as the local close-up picture of the mobile phone, the promotional copy about the mobile phone, or the like.

In an embodiment of the present disclosure, information related to the background image may also be presented. For example, in the case where the background image displayed by the terminal device is a certain advertisement video, after displaying the animation of the target visual effect in response to the visual effect change instruction, the product in the advertisement may be featured to deepen the impression of the user on the product.

In an embodiment of the present disclosure, if the content of the target visual effect is related to the content of the background image, the terminal device may also present information related to both the target visual effect and the background image in the interface. For example, in the case where the background image is a video image about the mobile phone advertisement, the target visual effect is an animation of the battery power change of the mobile phone, and after responding to the visual effect change instruction to display the animation of the battery power change of the mobile phone, information about the mobile phone may also be presented. For example, presenting the promotional copy (e.g., fast charging speed and strong battery endurance) of the mobile phone and/or images of the mobile phone may be impressive to the user that the battery of the mobile phone has a fast charging speed and long battery endurance, thereby increasing the favor of the user to the mobile phone.

In an embodiment of the present disclosure, presenting the information related to the target visual effect in Step S105 includes: replacing the target picture currently being displayed with the information related to the target visual effect.

It may be understood that, when presenting information related to the target visual effect, the target picture currently being displayed may be replaced with the information related to the target visual effect, so as to achieve the effect of focusing on presenting the information related to the target visual effect.

In order to better understand the embodiments of the present disclosure, examples may be referred to FIG. 2(a) to FIG. 2(f), which are schematic diagrams of an interaction process provided by at least one embodiment of the present disclosure.

Figure 2A:
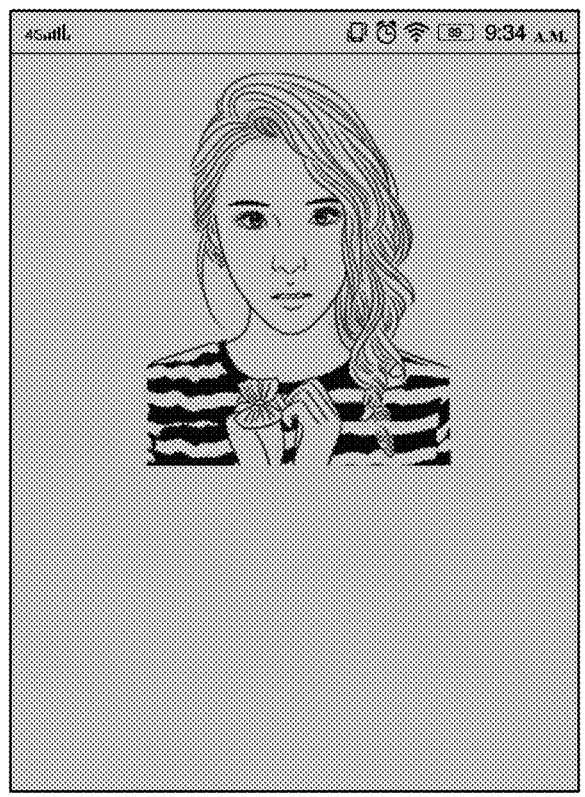
FIG. 2(a) to FIG. 2(f) are schematic diagrams of an interaction process provided by at least one embodiment of the present disclosure.
Figure 2B:
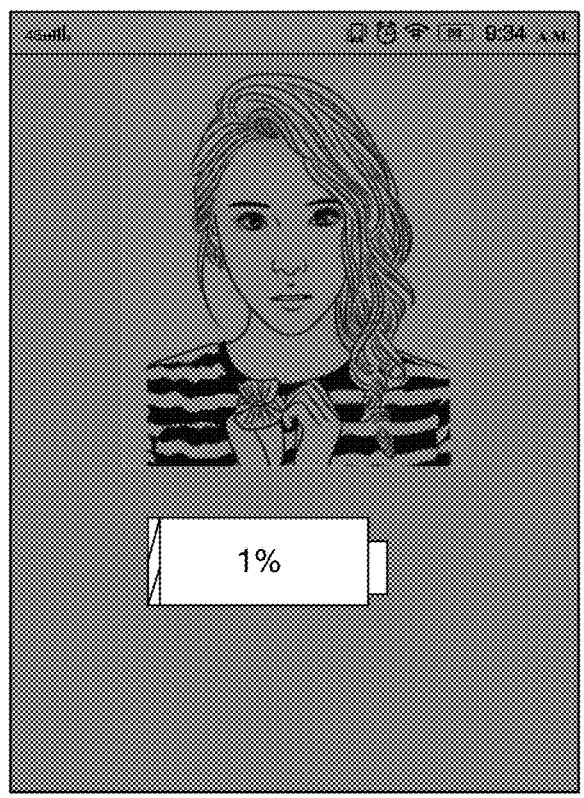
Figure 2C:
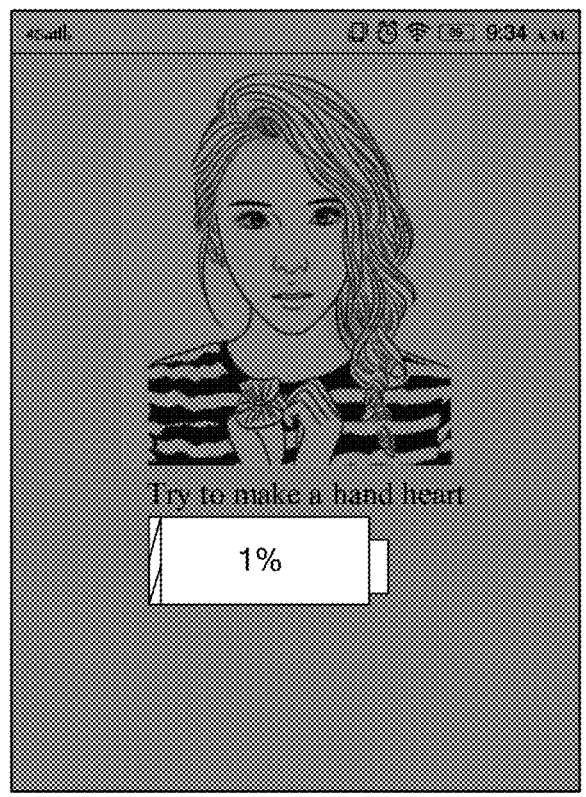
Figure 2D:
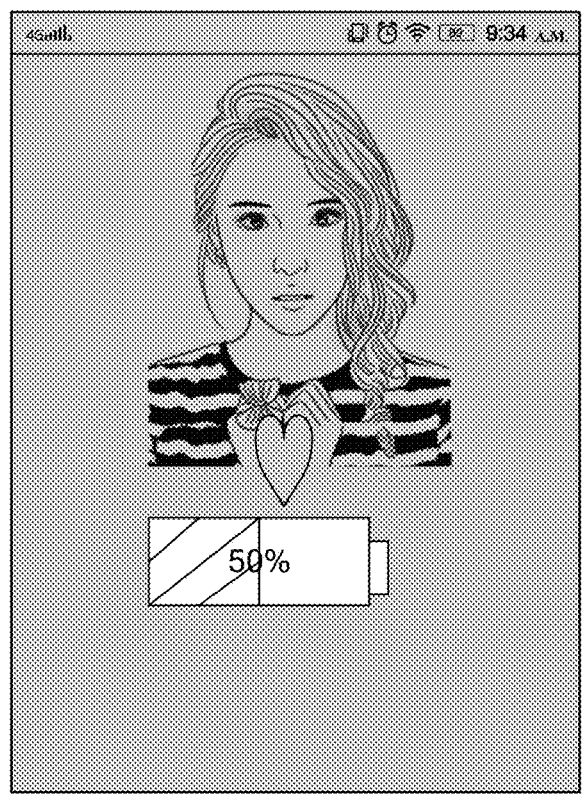
Figure 2E:
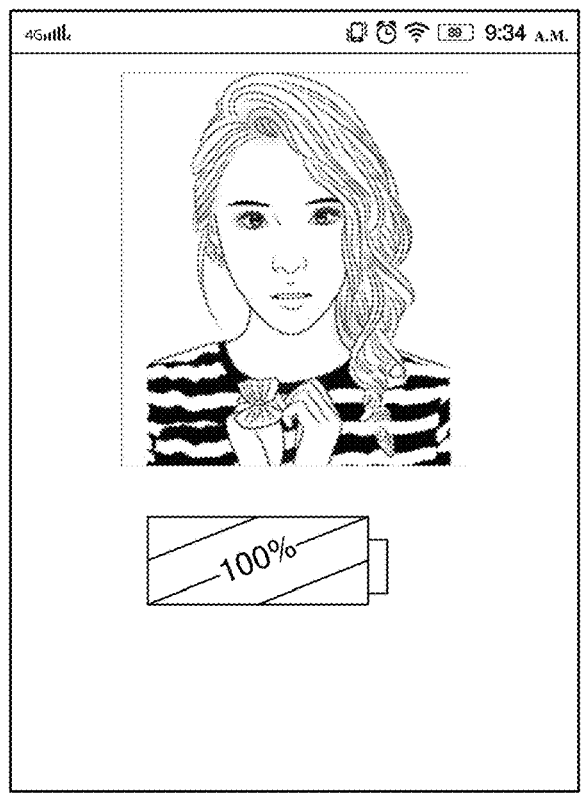
Figure 2F:
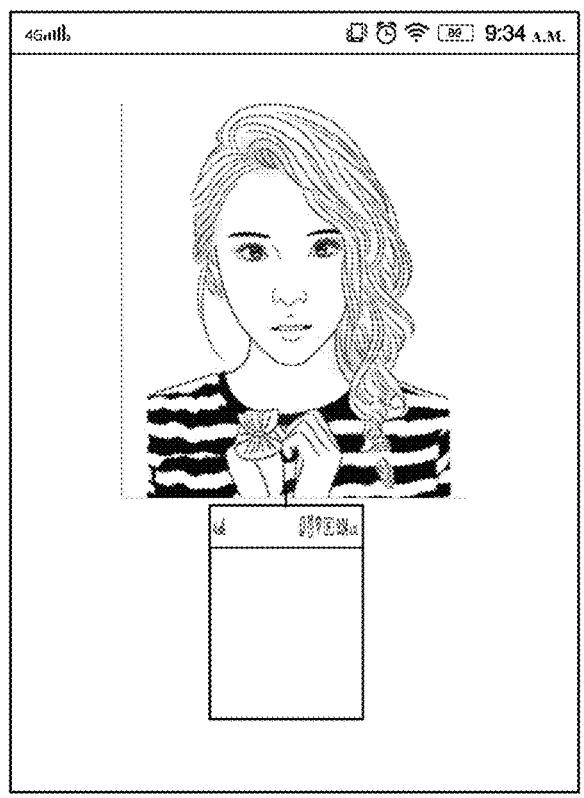

Taking a scenario where the user produces a video as an example, the background image may be the video image recorded by the user in real time, such as the avatar of the user, and FIG. 2(a) is the image of the user recording the video normally. After 5 seconds of recording, as illustrated in FIG. 2(b), the initial picture (for example, the initial picture of the target visual effect is a picture of a battery in a low power state) of the target visual effect is displayed at a preset position (for example, a specific position below) of the background image in response to the visual effect presentation instruction, and the brightness of the background image is presented as the third filter effect, such as a background image with medium brightness. After that, as illustrated in FIG. 2(c), the terminal device displays a prompt message (such as "try to make a hand heart"), and when the user makes the corresponding gesture, as illustrated in FIG. 2(d) to FIG. 2(e), the initial picture of the target visual effect gradually changes to the target picture. For example, the battery power state gradually changes from a low power state to a full power state, and at the same time, the filter effect of the background image gradually changes from the first filter effect to the second filter effect, for example, the brightness of the background image gradually becomes brighter. Finally, as illustrated in FIG. 2(f), by presenting the information related to the target visual effect, such as displaying an image of the mobile phone on the terminal device and replacing the image of the battery being fully charged, a video indicating that the mobile phone is quickly charged can be produced, which can further deepen the impression of the user on the fast charging of the mobile phone.

It should be noted that the interaction process illustrated in FIG. 2(a) to FIG. 2(f) is only an example, and should not impose any limitation on the function and scope of use of the embodiments of the present disclosure.

Further taking a scenario where the user watches a video as an example, examples may be referred to FIG. 3(a) to FIG. 3(f), which are schematic diagrams of another interaction process provided by at least one embodiment of the present disclosure.

Figure 3A:
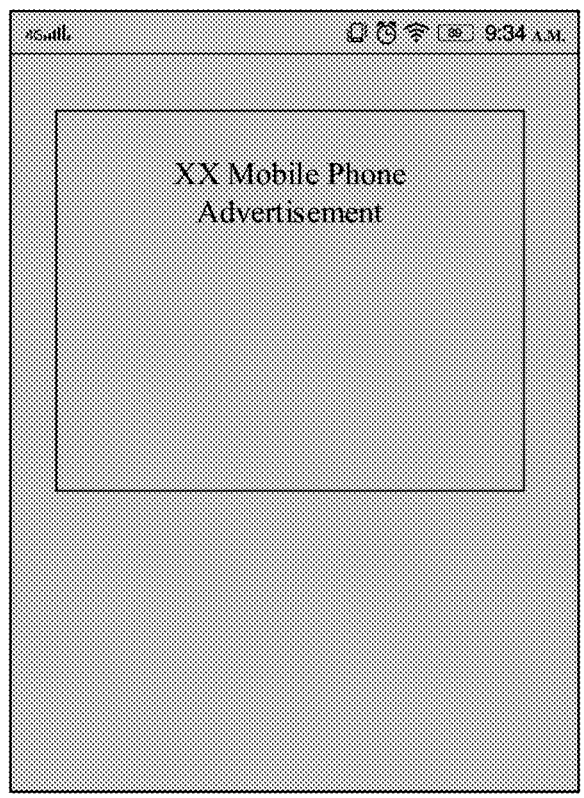
FIG. 3(a) to FIG. 3(f) are schematic diagrams of another interaction process provided by at least one embodiment of the present disclosure.
Figure 3B:
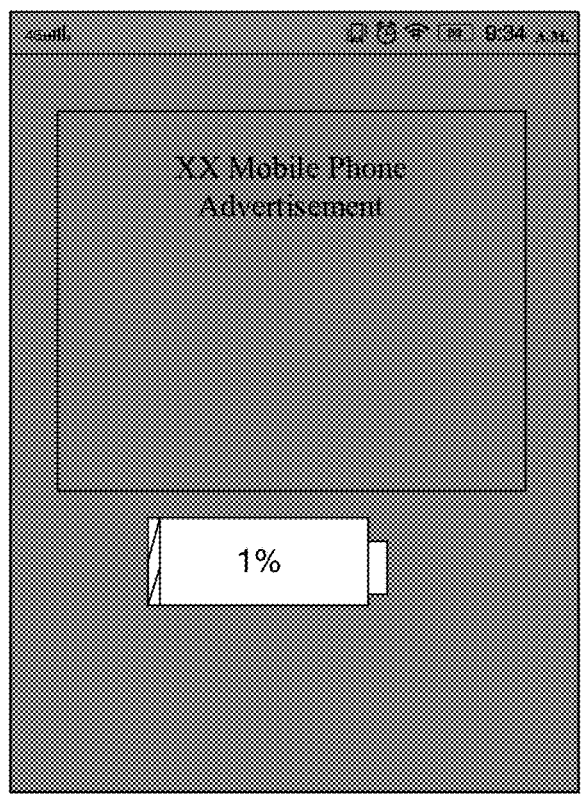
Figure 3C:
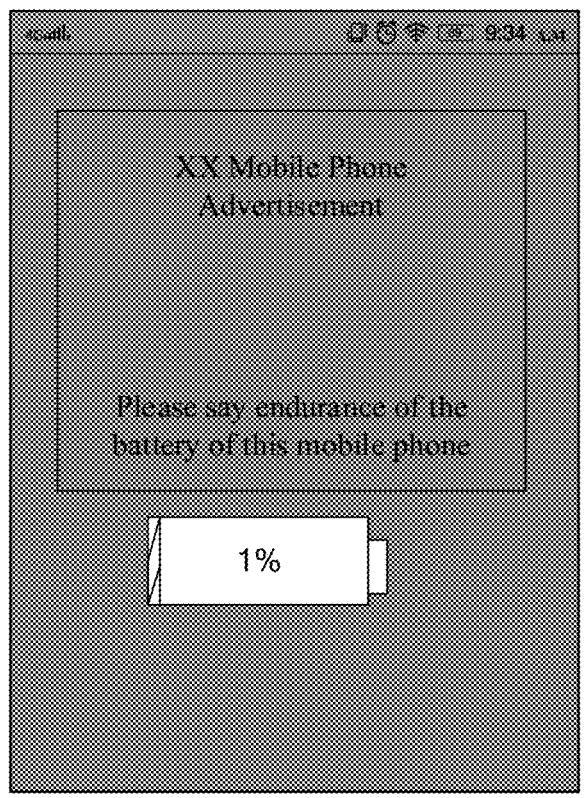
Figure 3D:
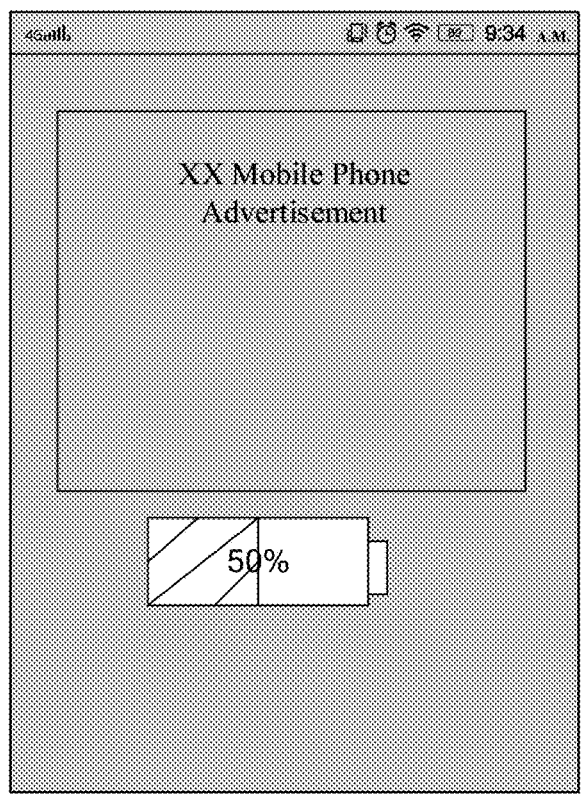
Figure 3E:
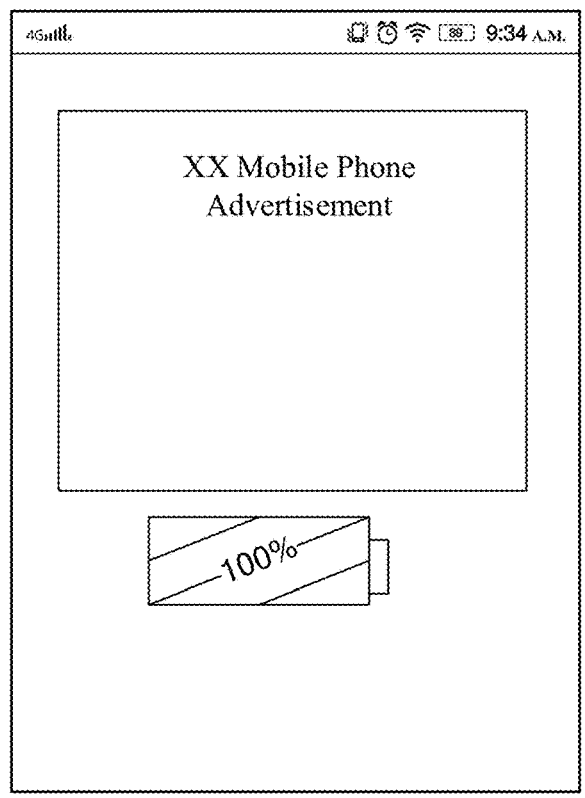
Figure 3F:
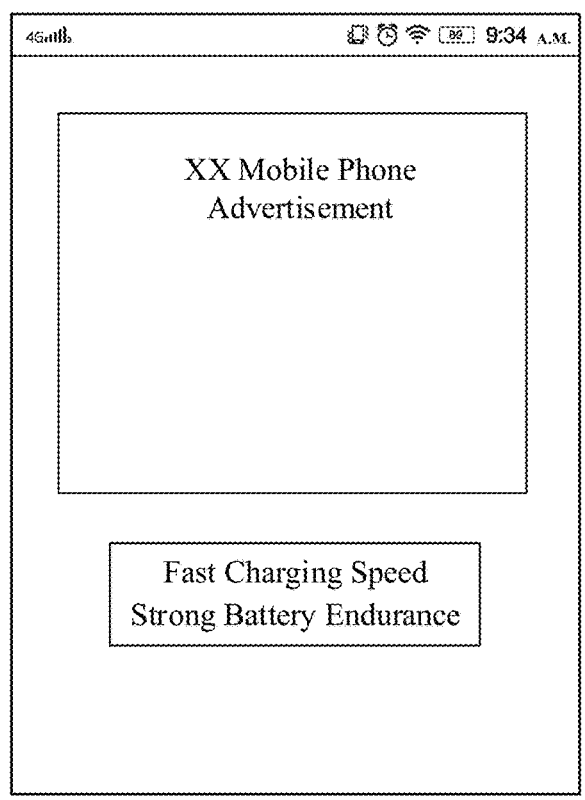

For example, the background image includes a video image about a mobile phone advertisement, such as a video image of a launch of a certain mobile phone, and FIG. 3(a) is an image of a normal playing video. After playing for a preset time (for example, 5 seconds), as illustrated in FIG. 3(b), the initial picture (for example, the initial picture of the target visual effect is a picture of a battery in a low power state) of the target visual effect is displayed at a preset position (for example, a specific position below) of the background image in response to a visual effect presentation instruction with a preset time of 5 seconds, and the brightness of the background image is presented as the third filter effect, such as a background image with medium brightness. After that, as illustrated in FIG. 3(c), the terminal device displays a prompt message (for example, please say endurance of the battery of this mobile phone), and after the user answers the correct answer (for example, the endurance is 13 hours), the terminal device generates the visual effect change instruction, as illustrated in FIG. 3(d) to FIG. 3(e), the initial picture of the target visual effect gradually changes to the target picture, for example, the battery power state gradually changes from a low power state to a full power state, and at the same time, the filter effect of the background image gradually changes from the first filter effect to the second filter effect, for example, the brightness of the background image gradually becomes brighter. Finally, as illustrated in FIG. 3(f), by presenting the information related to the target visual effect, such as displaying an image and/or promotional text (such as fast charging speed and strong battery endurance) of the mobile phone on the terminal device and replacing the image of the fully charged battery, the impression of the user that the mobile phone is charged relative fast and has long battery endurance can be enhanced.

It should be noted that the interaction process illustrated in FIG. 3(a) to FIG. 3(f) is only an example, and should not impose any limitation on the function and scope of use of the embodiments of the present disclosure.

Figure 4:
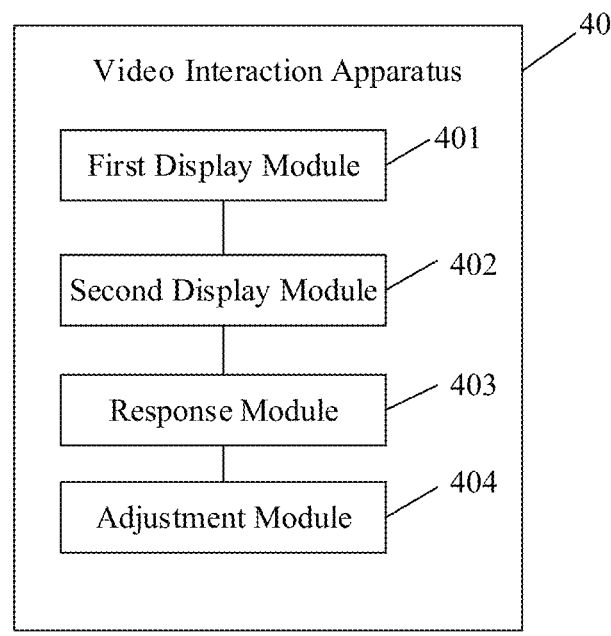
FIG. 4 is a schematic structural diagram of an interaction apparatus provided by at least one embodiment of the present disclosure.

At least one embodiment of the present disclosure further provides an interaction apparatus. As illustrated in FIG. 4, the interaction apparatus 40 includes a first display module 401, a second display module 402, a response module 403, and an adjustment module 404.

The first display module 401 is configured to display a background image.

The present disclosure does not limit the type of the background image. For example, the background image may include a video image, a picture, or the like. The present disclosure also does not limit the content of the background image. For example, the background image may include a human image, an animal image, a landscape image, or any combination of images of animals, people, and landscapes.

In an embodiment of the present disclosure, the background image includes at least one of the following: a real-time recorded video image, a pre-selected recorded video image, and at least one pre-selected image.

It should be understood that the background image may be a video image recorded in real time at the terminal during video production, a recorded video image selected during video production, or a selected picture. In addition, different videos and/or different pictures may be selected and displayed as the background image according to a preset presentation manner.

Optionally, the background image may also include a video image presented on the terminal, such as an advertisement video image.

The second display module 402 is configured to display an initial picture of a target visual effect at a preset position of the background image.

For example, the target visual effect in the embodiments of the present disclosure may be an animation visual special effect. The preset position of the background image may be a preset position in the orientation, such as the center, upper left corner or lower right corner of the background image. The preset position of the background image may also be a preset position in time, for example, in the case that the background image is a video image, when the video image is played to a preset time, the initial picture of the target visual effect is displayed.

In an embodiment of the present disclosure, the second display module 402 includes a second display sub-module.

The second display sub-module is configured to display the initial picture of the target visual effect at the preset position of the background image in response to a visual effect display instruction.

For example, the visual effect display instruction is an instruction triggered by the user. For example, the user selects the target visual effect among the visual effect templates, which triggers the visual effect display instruction of the target visual effect. For another example, the user clicks a specified button on the screen or gives a specified gesture, which triggers the visual effect display instruction of the target visual effect. The visual effect display instruction may also be preset. For example, in the case that the background image presented by the terminal device is a video image, when the video playback time reaches the predetermined time (such as 10 seconds), or when a certain target object (such as a flower or a dog) in the video is captured, the visual effect display instruction is considered to be triggered. In response to the visual effect display instruction, the terminal device displays the initial picture of the target visual effect at the preset position of the background image.

In an embodiment, the target visual effect is associated with the background image, i.e., the visual effect content of the target visual effect is associated with the image content of the background image.

For example, in the case that the background image is a video image about the mobile phone advertisement, the target visual effect may be the animation of the battery power change of the mobile phone, and the initial picture of the target visual effect may be a battery in a low power state. Specifically, in the case that the background image is an advertisement video about a mobile phone, when the video playback time reaches the predetermined time (for example, 10 seconds), the visual effect display instruction is triggered, and the terminal device may display the battery in a low power state at the center of the video image in response to the visual effect display instruction.

It should be noted that the target visual effect may be pre-stored in a server or in a terminal. When the visual effect display instruction is triggered, the terminal device may display the initial picture of the target visual effect at the preset position of the background image in response to the visual effect display instruction, and the initial picture is the first frame image of the target visual effect.

In an embodiment of the present disclosure, the second display module 402 further includes a second adjustment sub-module.

The second adjustment sub-module is configured to adjust the filter effect of the background image to allow the filter effect of the background image to change from the third filter effect to the first filter effect.

For example, the filter effect of the background image includes blurriness, grayscale, brightness, or the like of the background image. Taking the filter effect including the brightness effect as an example, the brightness effect of the third filter effect may be medium brightness, the brightness effect of the first filter effect may be low brightness, and the brightness levels of medium brightness and low brightness may be represented by preset brightness values. The present disclosure does not limit the specific brightness of the background image, which is only used for illustration purposes here.

Specifically, HSB (Hue, Saturation, and Brightness) values corresponding to the first filter effect may be stored in advance. After the visual effect display instruction is triggered, the HSB values corresponding to the third filter effect in the background image may be replaced with the pre-stored HSB values corresponding to the first filter effect. It should be noted that the third filter effect is the initial filter effect when the background image is displayed in Step S101, and the HSB values can be adjusted to allow the third filter effect to change to the first filter effect, for example, by adjusting the B value in the HSB values to allow the brightness of the background image to be dimmed.

It should be understood by those skilled in the art that the above only takes the filter effect including the brightness effect as an example for description. The present disclosure does not limit the type of the filter effect, and for other types of filter effects, the terminal device may adjust the filter effect of the background image by adjusting parameters such as the saturation, hue, or the like of the image in a similar manner, so that the filter effect of the background image is changed from the third filter effect to the first filter effect.

The response module 403 is configured to control the target visual effect to gradually change from the initial picture to a target picture in response to a visual effect change instruction triggered by a user.

For example, the visual effect change instruction may be triggered by the user, such as a specific audio or a specific action. When the terminal device captures the specific audio or action of the user, it can be considered that the user triggers the visual effect change instruction. The present disclosure does not limit the visual effect change instruction.

The terminal device can respond to the visual effect change instruction, thereby controlling the initial picture of the target visual effect to gradually change to the target picture. In an embodiment, the terminal device can gradually change the RGB (Red, Green, and Blue) values of each key frame image in the target visual effect image to achieve the effect of gradually changing from the initial picture to the target picture.

In an embodiment of the present disclosure, the interaction apparatus 40 further includes a prompt sub-module and a generation sub-module.

The prompt sub-module is configured to display a first prompt, the first prompt being configured to instruct the user to perform a preset action.

The generation sub-module is configured to generate the visual effect change instruction in response to detecting the preset action performed by the user.

It may be understood that, the visual effect change instruction may be generated in response to the user inputting a preset action. Specifically, the terminal device may display a first prompt message, for example, the first prompt message includes prompting the user to perform a specific action, make a specific expression, make a specific sound, etc., for example, prompting the user to input an action of "hand heart" or "nod." When the terminal device detects that the user has inputted the action of "hand heart" or "nod," it is considered that the user triggers the visual effect change instruction, and the visual effect change instruction is generated.

In an embodiment of the present disclosure, generating the visual effect change instruction further includes: generating the visual effect change instruction in response to detecting that the user has answered the interaction question correctly. Specifically, the terminal device may give a question related to the background video image being currently displayed or related to the target visual effect in the form of text display or voice playback. When it is detected that the user has answered the correct answer, it is considered that the user triggers the visual effect change instruction, and accordingly the visual effect change instruction is generated. For example, in the case that the background image currently displayed is a video image about a certain product (for example, a mobile phone), the terminal device gives a question about the brand of the mobile phone, and when the user inputs, by text or voice, the correct brand of the mobile phone, it is considered that the user triggers the visual effect change instruction.

The adjustment module 404 is configured to adjust a filter effect of the background image to allow the filter effect of the background image to gradually change from a first filter effect to a second filter effect during a change of the target visual effect.

For example, still taking the filter effect including the brightness effect as an example, the brightness effect of the first filter effect may be low brightness, and the brightness effect of the second filter effect may be high brightness. It may be understood that during the changing process of the target visual effect, the filter effect of the background image may be adjusted at the same time to present a rich visual special effect, so as to attract the user to make videos or attract the user to visit and interact with videos.

Specifically, the HSB values corresponding to the second filter effect may be pre-stored, and after the visual effect change instruction being detected, the terminal device may gradually adjust the HSB values corresponding to the first filter effect of the background image until reaching the HSB values corresponding to the second filter effect. It should be noted that, the first filter effect may be a filter effect in which the brightness of the background image is dimmed by adjusting the B value in the HSB values corresponding to the third filter effect. For example, the HSB values corresponding to the first filter effect may be gradually adjusted to allow the first filter effect to gradually change to the second filter effect. For example, the B value in the HSB values corresponding to the first filter effect may be gradually adjusted to brighten the brightness of the background image.

It should be noted that the above only takes the brightness effect as an example to introduce the filter effect, and the brightness effect is only one of effect elements in the filter effect. The present disclosure can actually transform one or more effect elements in the brightness, hue, saturation, or the like, that is, the present disclosure does not limit the combination manner of effect elements that need to be transformed, nor the transformation manner of the filter effect.

In an embodiment of the present disclosure, the adjustment module 404 includes a first adjustment sub-module.

The first adjustment sub-module is configured to adjust a change progress of the filter effect of the background image based on a change progress of the target visual effect.

It may be understood that, in order to make the visual effect viewed by the user more uniform, the change progress of the target visual effect may be unified with the change progress of the filter effect of the background image. That is, the terminal device can adjust the change progress of the filter effect of the background image according to the change progress of the target visual effect, so that the filter effect of the background image changes with the change of the target visual effect.

For example, taking the case where the change of the target visual effect includes the change of the color of the special effect picture and the change of the filter effect includes the change of the brightness effect as an example, the terminal device takes a target visual effect layer in the video picture as the first image layer and a background image layer as the second image layer, and by setting the change of the color of the special effect picture of the first image layer to be unified with the change of the brightness of the background image of the second image layer, the effect that the change progress of the target visual effect is unified with the change progress of the filter effect of the background image can be achieved.

Specifically, the terminal device may preset the corresponding relationship between the RGB values of the first image layer (i.e., the target visual effect layer) in the video picture and the HSB values of the second image layer (i.e., the background image layer), that is, the RGB values of each key frame image of the target visual effect layer at each time of change is in a one-to-one correspondence with the HSB values, at each corresponding time of change, of the background image in the background image layer at each corresponding time node. Based on this, by gradually changing the RGB values of each key frame image, the terminal device can simultaneously change the HSB values of the background image corresponding to each time of change, so as to achieve the result that the change progress of the target visual effect is unified with the change progress of the filter effect of the background image in the changing process of the target visual effect.

In the present disclosure, by displaying the background image, displaying the initial picture of the target visual effect at the preset position of the background image, and responding to the visual effect change instruction triggered by the user, the target visual effect can be controlled to gradually change from the initial picture to the target picture. That is, by interacting with the user, the user can participate in the changing process of the visual effect, and the participation of the user can be improved. Moreover, as the target visual effect gradually changes from the initial picture to the target picture, the filter effect of the background image is gradually adjusted, so as to present an abundant visual effect through the combination of visual special effect change and filter effect change, and improve the enthusiasm of participation and interaction of the user.

In an embodiment of the present disclosure, the interaction apparatus 40 further includes a presentation module.

The presentation module is configured to present information related to the target visual effect after controlling the target visual effect to gradually change from the initial picture to the target picture.

The information includes, but is not limited to, text, icons, static images, animation effects, or the like. The present disclosure does not limit the specific display manner and display content of the information.

For example, the information related to the target visual effect includes promotional information related to the target visual effect. For example, in the case where the animation of the target visual effect is the animation of the charging effect of the mobile phone battery, the target visual effect gradually changes from the initial picture to the target picture, which is exemplified as the mobile phone battery gradually changes from being with no power to full power, and accordingly the information related to the target visual effect may be the promotional information about the mobile phone, such as the local close-up picture of the mobile phone, the promotional copy about the mobile phone, or the like.

In an embodiment of the present disclosure, information related to the background image may also be presented. For example, in the case where the background image displayed by the terminal device is a certain advertisement video, after displaying the animation of the target visual effect in response to the visual effect change instruction, the product in the advertisement may be featured to deepen the impression of the user on the product.

In an embodiment of the present disclosure, if the content of the target visual effect is related to the content of the background image, the terminal device may also present information related to both the target visual effect and the background image in the interface. For example, in the case where the background image is a video image about the mobile phone advertisement, the target visual effect is an animation of the battery power change of the mobile phone, and after responding to the visual effect change instruction to display the animation of the battery power change of the mobile phone, information about the mobile phone may also be presented. For example, presenting the promotional copy (e.g., fast charging speed and strong battery endurance) of the mobile phone and/or images of the mobile phone may be impressive to the user that the battery of the mobile phone has a fast charging speed and long battery endurance, thereby increasing the favor of the user to the mobile phone.

In an embodiment of the present disclosure, the presentation module includes a replacement sub-module.

The replacement sub-module is configured to replace the target picture currently being displayed with the information related to the target visual effect.

It may be understood that, when presenting information related to the target visual effect, the target picture currently being displayed may be replaced with the information related to the target visual effect, so as to achieve the effect of focusing on presenting the information related to the target visual effect.

The above-mentioned modules may be implemented as software components executed on one or more general processors, or may be implemented as hardware such as programmable logic devices and/or application specific integrated circuits that perform certain functions or combinations thereof. In some embodiments, these modules are embodied in the form of software products, which can be stored in non-volatile storage media, and these non-volatile storage media include computer programs that enable computer devices (such as a personal computer, a server, a network device, a mobile terminal, etc.) to implement the methods described in the embodiments of the present disclosure. In an embodiment, the above-mentioned modules may also be implemented on a single device, or may be distributed on multiple devices. The functions of these modules may be combined with each other or further split into multiple sub-modules.

Figure 5:
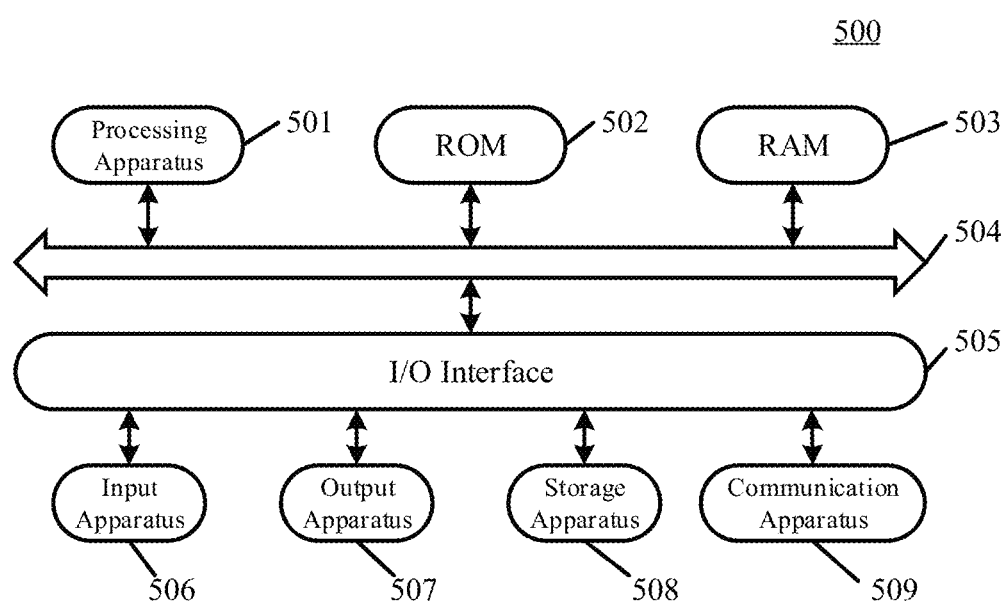
FIG. 5 is a schematic structural diagram of an electronic device provided by at least one embodiment of the present disclosure.

Referring to FIG. 5, FIG. 5 illustrates a schematic structural diagram of an electronic device 500 suitable for implementing some embodiments of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and fixed terminals such as a digital TV, a desktop computer, or the like. The electronic device illustrated in FIG. 5 is merely an example, and should not pose any limitation to the functions and the range of use of the embodiments of the present disclosure.

The electronic device includes a memory and a processor, where the processor here may be referred to as a processing apparatus 501 described below, and the memory may include at least one selected from a group consisting of a read-only memory (ROM) 502, a random access memory (RAM) 503, and a storage apparatus 508 hereinafter. The memory is configured to store programs for executing the methods described in the above method embodiments, and the processor is configured to execute the programs stored in the memory. The processor may include a central processing unit (CPU) or other form of processing unit having data processing capabilities and/or instruction executing capabilities, and can control other components in the electronic device to perform desired functions.

As illustrated in FIG. 5, the electronic device 500 may include a processing apparatus 501 (e.g., a central processing unit, a graphics processing unit, etc.), which can perform various suitable actions and processing according to a program stored in a read-only memory (ROM) 502 or a program loaded from a storage apparatus 508 into a random access memory (RAM) 503. The RAM 503 further stores various programs and data required for operations of the electronic device 500. The processing apparatus 501, the ROM 502, and the RAM 503 are interconnected by means of a bus 504. An input/output (I/O) interface 505 is also connected to the bus 504.

Usually, the following apparatus may be connected to the I/O interface 505: an input apparatus 506 including, for example, a touch screen, a touch pad, a keyboard, a mouse, a camera, a microphone, an accelerometer, a gyroscope, or the like; an output apparatus 507 including, for example, a liquid crystal display (LCD), a loudspeaker, a vibrator, or the like; a storage apparatus 508 including, for example, a magnetic tape, a hard disk, or the like; and a communication apparatus 509. The communication apparatus 509 may allow the electronic device 500 to be in wireless or wired communication with other devices to exchange data. While FIG. 5 illustrates the electronic device 500 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 509 and installed, or may be installed from the storage apparatus 508, or may be installed from the ROM 502. When the computer program is executed by the processing apparatus 501, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-described computer-readable medium may be included in the above-described electronic device, or may also exist alone without being assembled into the electronic device.

The above-described computer-readable medium carries one or more programs, and when the one or more programs are executed by the electronic device, the electronic device is caused to: display a background image; display an initial picture of a target visual effect at a preset position of the background image; control the target visual effect to gradually change from the initial picture to a target picture in response to a visual effect change instruction triggered by a user; and adjust a filter effect of the background image to allow the filter effect of the background image to gradually change from a first filter effect to a second filter effect during a change of the target visual effect.

The computer program codes for performing the operations of the present disclosure may be written in one or more programming languages or a combination thereof. The above-described programming languages include but are not limited to object-oriented programming languages such as Java, Smalltalk, C++, and also include conventional procedural programming languages such as the "C" programming language or similar programming languages. The program code may by executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flow chart and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, an interaction method is provided, including:
 displaying a background image;
 displaying an initial picture of a target visual effect at a preset position of the background image;
 controlling the target visual effect to gradually change from the initial picture to a target picture in response to a visual effect change instruction triggered by a user; and
 adjusting a filter effect of the background image to allow the filter effect of the background image to gradually change from a first filter effect to a second filter effect during a change of the target visual effect.

In an embodiment of the present disclosure, adjusting the filter effect of the background image includes:
 adjusting a change progress of the filter effect of the background image based on a change progress of the target visual effect.

In an embodiment of the present disclosure, displaying the initial picture of the target visual effect at the preset position of the background image includes:
 displaying the initial picture of the target visual effect at the preset position of the background image in response to a visual effect display instruction.

In an embodiment of the present disclosure, displaying the initial picture of the target visual effect further includes:
adjusting the filter effect of the background image to allow the filter effect of the background image to change from a third filter effect to the first filter effect.

In an embodiment of the present disclosure, the interaction method further includes:
displaying a first prompt, wherein the first prompt is configured to instruct the user to perform a preset action; and
generating the visual effect change instruction in response to detecting the preset action performed by the user.

In an embodiment of the present disclosure, after controlling the target visual effect to gradually change from the initial picture to the target picture, the interaction method further includes:
presenting information related to the target visual effect.

In an embodiment of the present disclosure, presenting the information related to the target visual effect includes:
replacing the target picture currently being displayed with the information related to the target visual effect.

In an embodiment of the present disclosure, the background image includes at least one selected from a group consisting of: a real-time recorded video image, a pre-selected recorded video image, or at least one pre-selected image.

According to one or more embodiments of the present disclosure, an interaction apparatus is provided and includes:
a first display module, being configured to display a background image;
a second display module, being configured to display an initial picture of a target visual effect at a preset position of the background image;
a response module, being configured to control the target visual effect to gradually change from the initial picture to a target picture in response to a visual effect change instruction triggered by a user; and
an adjustment module, being configured to adjust a filter effect of the background image to allow the filter effect of the background image to gradually change from a first filter effect to a second filter effect during a change of the target visual effect.

In an embodiment of the present disclosure, the adjustment module includes:
a first adjustment sub-module, being configured to adjust a change progress of the filter effect of the background image based on a change progress of the target visual effect.

In an embodiment of the present disclosure, the second display module includes:
a second display sub-module, being configured to display the initial picture of the target visual effect at the preset position of the background image in response to a visual effect display instruction.

In an embodiment of the present disclosure, the second display module further includes:
a second adjustment sub-module, being configured to adjust the filter effect of the background image to allow the filter effect of the background image to change from a third filter effect to the first filter effect.

In an embodiment of the present disclosure, the interaction apparatus further includes:
a prompt sub-module, being configured to display a first prompt, the first prompt being configured to instruct the user to perform a preset action; and
a generation sub-module, being configured to generate the visual effect change instruction in response to detecting the preset action performed by the user.

In an embodiment of the present disclosure, the interaction apparatus further includes:
a presentation module, being configured to present information related to the target visual effect after controlling the target visual effect to gradually change from the initial picture to the target picture.

In an embodiment of the present disclosure, the presentation module includes:
a replacement sub-module, being configured to replace the target picture currently being displayed with the information related to the target visual effect In an embodiment of the present disclosure, the background image includes at least one selected from a group consisting of: a video image recorded in real time by a user, a recorded video image preselected by the user, or at least one image preselected by the user.

According to one or more embodiments of the present disclosure, an electronic device is provided and includes one or more processors and a memory.

The memory is configured to store one or more applications, and the one or more applications upon execution by the one or more processors, cause the one or more processors to implement the interaction method mentioned above.

According to one or more embodiments of the present disclosure, a computer-readable storage medium is provided, a computer program is stored on the computer-readable storage medium, and the computer program, when executed by a processor, causes the processor to implement the interaction method mentioned above.

The above description is merely a preferred embodiment of the present disclosure and an illustration of the technical principles employed. Those skilled in the art should understand that the scope of disclosure involved in the present disclosure is not limited to the technical solutions formed by the specific combination of the above-mentioned technical features, and should also cover, without departing from the above-mentioned disclosed concept, other technical solutions formed by any combination of the above-mentioned technical features or their equivalents, such as technical solutions which are formed by replacing the above-mentioned technical features with the technical features disclosed in the present disclosure (but not limited to) with similar functions.

Additionally, although operations are depicted in a particular order, it should not be understood that these operations are required to be performed in a specific order as illustrated or in a sequential order. Under certain circumstances, multitasking and parallel processing may be advantageous. Likewise, although the above discussion includes several specific implementation details, these should not be interpreted as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combinations.

Although the subject matter has been described in language specific to structural features and/or method logical actions, it should be understood that the subject matter defined in the appended claims is not necessarily limited to the specific features or actions described above. Rather, the specific features and actions described above are merely example forms of implementing the claims.

What is claimed is:

1. An interaction method, comprising:
   displaying a background image;
   displaying an initial picture of a target visual effect at a preset position of the background image, wherein a visual effect content of the target visual effect is associated with an image content of the background image;
   controlling the target visual effect to gradually change from the initial picture to a target picture in response to a visual effect change instruction triggered by a user; and
   adjusting a filter effect of the background image according to a change of the target visual effect from the initial picture to the target picture, to allow the filter effect of the background image to gradually change from a first filter effect to a second filter effect with the change of the target visual effect from the initial picture to the target picture.

2. The method according to claim 1, wherein adjusting the filter effect of the background image comprises:
   adjusting a change progress of the filter effect of the background image based on a change progress of the target visual effect.

3. The method according to claim 1, wherein displaying the initial picture of the target visual effect at the preset position of the background image comprises:
   displaying the initial picture of the target visual effect at the preset position of the background image in response to a visual effect display instruction.

4. The method according to claim 1, wherein displaying the initial picture of the target visual effect further comprises:
   adjusting the filter effect of the background image to allow the filter effect of the background image to change from a third filter effect to the first filter effect.

5. The method according to claim 1, further comprising:
   displaying a first prompt, wherein the first prompt is configured to instruct the user to perform a preset action; and
   generating the visual effect change instruction in response to detecting the preset action performed by the user.

6. The method according to claim 1, wherein after controlling the target visual effect to gradually change from the initial picture to the target picture, the method further comprises:
   presenting information related to the target visual effect.

7. The method according to claim 6, wherein presenting the information related to the target visual effect comprises:
   replacing the target picture currently being displayed with the information related to the target visual effect.

8. The method according to claim 1, wherein the background image comprises at least one selected from a group consisting of:
   a real-time recorded video image,
   a pre-selected recorded video image, or
   at least one pre-selected image.

9. A non-transitory computer-readable storage medium, on which a computer program is stored, wherein the computer program, when executed by a processor, causes the processor to implement the interaction method according to claim 1.

10. An interaction apparatus, comprising:
    a first display module, configured to display a background image;
    a second display module, configured to display an initial picture of a target visual effect at a preset position of the background image, wherein a visual effect content of the target visual effect is associated with an image content of the background image;
    a response module, configured to control the target visual effect to gradually change from the initial picture to a target picture in response to a visual effect change instruction triggered by a user; and
    an adjustment module, configured to adjust a filter effect of the background image according to a change of the target visual effect from the initial picture to the target picture, to allow the filter effect of the background image to gradually change from a first filter effect to a second filter effect with the change of the target visual effect from the initial picture to the target picture.

11. The apparatus according to claim 10, wherein the second display module comprises an adjustment sub-module, and
    the adjustment sub-module of the second display module is configured to adjust the filter effect of the background image to allow the filter effect of the background image to change from a third filter effect to the first filter effect.

12. The apparatus according to claim 10, wherein the second display module further comprises a display sub-module, and
    the display sub-module of the second display module is configured to display the initial picture of the target visual effect at the preset position of the background image in response to a visual effect display instruction.

13. An electronic device, comprising:
    one or more processors, and
    a memory, wherein the memory is configured to store one or more applications, and the one or more applications, upon execution by the one or more processors, cause the one or more processors to:
    display a background image;
    display an initial picture of a target visual effect at a preset position of the background image, wherein a visual effect content of the target visual effect is associated with an image content of the background image;
    control the target visual effect to gradually change from the initial picture to a target picture in response to a visual effect change instruction triggered by a user; and
    adjust a filter effect of the background image according to a change of the target visual effect from the initial picture to the target picture, to allow the filter effect of the background image to gradually change from a first filter effect to a second filter effect with the change of the target visual effect from the initial picture to the target picture.

14. The electronic device according to claim 13, wherein adjusting the filter effect of the background image comprises:
    adjusting a change progress of the filter effect of the background image based on a change progress of the target visual effect.

15. The electronic device according to claim 13, wherein displaying the initial picture of the target visual effect at the preset position of the background image comprises:
    displaying the initial picture of the target visual effect at the preset position of the background image in response to a visual effect display instruction.

16. The electronic device according to claim 13, wherein displaying the initial picture of the target visual effect further comprises:
    adjusting the filter effect of the background image to allow the filter effect of the background image to change from a third filter effect to the first filter effect.

17. The electronic device according to claim 13, wherein the one or more applications, upon execution by the one or more processors, further cause the one or more processors to:
- display a first prompt, wherein the first prompt is configured to instruct the user to perform a preset action; and
- generate the visual effect change instruction in response to detecting the preset action performed by the user.

18. The electronic device according to claim 13, wherein the one or more applications, upon execution by the one or more processors, further cause the one or more processors to:
- present information related to the target visual effect after the target visual effect is controlled to gradually change from the initial picture to the target picture.

19. The electronic device according to claim 18, wherein presenting the information related to the target visual effect comprises:
- replacing the target picture currently being displayed with the information related to the target visual effect.

20. The electronic device according to claim 13, wherein the background image comprises at least one selected from a group consisting of:
- a real-time recorded video image,
- a pre-selected recorded video image, or
- at least one pre-selected image.

* * * * *